United States Patent
Venugopal et al.

(10) Patent No.: US 11,166,172 B2
(45) Date of Patent: Nov. 2, 2021

(54) BEAM IDENTIFICATION FOR MULTI-TCI TRANSMISSION

(71) Applicant: QUALCOMM Incorporated, San Diego, CA (US)

(72) Inventors: Kiran Venugopal, Raritan, NJ (US); Makesh Pravin John Wilson, San Diego, CA (US); Junyi Li, Chester, NJ (US); Tianyang Bai, Bridgewater, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 16/456,949

(22) Filed: Jun. 28, 2019

(65) Prior Publication Data

US 2020/0022000 A1 Jan. 16, 2020

Related U.S. Application Data

(60) Provisional application No. 62/698,541, filed on Jul. 16, 2018.

(51) Int. Cl.
*H04W 16/28* (2009.01)
*H04W 88/06* (2009.01)
*H04W 24/10* (2009.01)
*H04W 72/04* (2009.01)

(52) U.S. Cl.
CPC ........... *H04W 16/28* (2013.01); *H04W 24/10* (2013.01); *H04W 72/046* (2013.01); *H04W 88/06* (2013.01)

(58) Field of Classification Search
CPC ..... H04W 16/28; H04W 88/06; H04W 24/10; H04W 72/046; H04B 7/0408; H04B 7/0617; H04B 7/0619; H04B 7/063; H04B 7/0695; H04B 7/088
See application file for complete search history.

(56) References Cited

U.S. PATENT DOCUMENTS

| | | | |
|---|---|---|---|
| 2007/0243831 A1 | 10/2007 | Seki | |
| 2013/0172002 A1 | 7/2013 | Yu et al. | |
| 2015/0282122 A1 | 10/2015 | Kim | |
| 2019/0109687 A1* | 4/2019 | Takeda | H04B 7/088 |
| 2019/0174337 A1* | 6/2019 | Prasad | H04B 17/309 |
| 2019/0191411 A1* | 6/2019 | Petersson | H04B 7/0617 |
| 2020/0059290 A1* | 2/2020 | Pan | H04B 7/0695 |

OTHER PUBLICATIONS

International Search Report and Written Opinion—PCT/US2019/040152—ISA/EPO—dated Sep. 23, 2019.

* cited by examiner

*Primary Examiner* — Ricardo H Castaneyra
(74) *Attorney, Agent, or Firm* — Qualcomm Incorporated

(57) ABSTRACT

Aspects of the present disclosure provide techniques to improve reliability and robustness for millimeter wave (mmW) systems in fifth generation (5G) wireless communications technology (also referred to as new radio (NR)). Specifically, the present disclosure provides techniques to allow the base station to group a plurality of mmW beams for communication with the user equipment (UE) such that the selected beam(s) for communication are independent and uncorrelated. The selection of beams ensure macro-diversity in that the joint blocking probability of the selected beam(s) may be minimized and the susceptibility to blockage is reduced in comparison to the current systems.

29 Claims, 7 Drawing Sheets

BEAM IDENTIFICATION FOR MULTI-TCI TRANSMISSION

CROSS-REFERENCE TO RELATED APPLICATION(S)

This application claims benefit of U.S. Provisional Application Ser. No. 62/698,541, entitled "Beam Identification for Multi-TCI Transmission" and filed Jul. 16, 2018, which is expressly incorporated by reference herein in its entirety.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems.

However, mobile networks are facing soaring demands for mobile data as consumers increasingly utilize mobile devices to share and consume high-definition multi-media. In addition, as the capabilities of mobile devices continue to grow with advancements such as higher-resolution cameras, 4K video, always-connected cloud computing, and virtual/augmented reality, so does the ever-increasing demand for faster and improved connectivity. Enhancing mobile broadband services is one of the driving forces behind a fifth generation (5G) wireless communications technology (which can be referred to as new radio (NR)) that is envisaged to expand and support diverse usage scenarios and applications with respect to current mobile network generations.

One aspect of the 5G communications technology includes the use of high-frequency spectrum bands above 24 GHz, which may be referred to as millimeter wave (mmW) band, that is emerging as a 5G NR technology. The use of these bands is compelling as the large bandwidths available at these high frequencies enable extremely high data rates and significant increases in capacity. However, mmW bands generally lack robustness for mobile broadband applications due to increased propagation loss and susceptibility to blockage (e.g., hand, head, body, foliage, buildings or other structures).

Thus, as the demand for mobile broadband access continues to increase, further improvements in NR communications technology and beyond may be desired.

SUMMARY

Aspects of the present disclosure provide techniques to improve reliability and robustness for mmW systems in 5GNR communications technology by allowing the base station to group a plurality of mmW beams for communication with the user equipment (UE) such that the selected beam(s) for communication are independent and uncorrelated. Particularly, the techniques outlined herein allow for selection of beams that ensure macro-diversity in that the joint blocking probability of the selected beam(s) may be minimized and the susceptibility to blockage is reduced in comparison to the current systems.

In one example, a method for wireless communication implemented by a UE is disclosed. The method may include receiving, at the UE, a beam diversity request from a base station. The method may further include performing beam measurements for a plurality of directional candidate beams transmitted by the base station towards the UE based in part on the beam diversity request. In some examples, the beam measurements may comprise beam characteristic correlation information for the plurality of directional candidate beams. The method may further include transmitting a beam diversity response based on the beam measurements.

In another example, a use for wireless communication is disclosed. The UE may include a memory configured to store instructions and a processor communicatively coupled with the memory. The processor may be configured to execute the instructions to receive, at the UE, a beam diversity request from a base station. The processor may further be configured to execute instructions to perform beam measurements for a plurality of directional candidate beams transmitted by the base station towards the UE based in part on the beam diversity request. In some examples, the beam measurements may comprise beam characteristic correlation information for the plurality of directional candidate beams. The processor may further be configured to execute instructions to transmit a beam diversity response based on the beam measurements.

In another example, a method for wireless communication implemented by a base station is disclosed. The method may include transmitting a beam diversity request to a UE, wherein the beam diversity request is associated with a plurality of directional candidate beams transmitted by the base station towards the UE. The method may further include receiving, from the UE, a beam diversity response based on the beam diversity request. The method may further include grouping one or more beams from the plurality of directional candidate beams into a transmission configuration indication (TCI) state, wherein the one or more beams are selected based on beam characteristic correlation information for the plurality of directional candidate beams.

In another example, an apparatus for wireless communication is disclosed. The apparatus may include a memory configured to store instructions and a processor communicatively coupled with the memory. The processor may be configured to execute the instructions to transmit a beam diversity request to a UE, wherein the beam diversity request is associated with a plurality of directional candidate beams transmitted by the base station towards the UE. The processor may further be configured to execute instructions to receive, from the UE, a beam diversity response based on the beam diversity request. The processor may further be configured to execute instructions to group one or more beams from the plurality of directional candidate beams into a transmission configuration indication (TCI) state, wherein the one or more beams are selected based on beam characteristic correlation information for the plurality of directional candidate beams.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
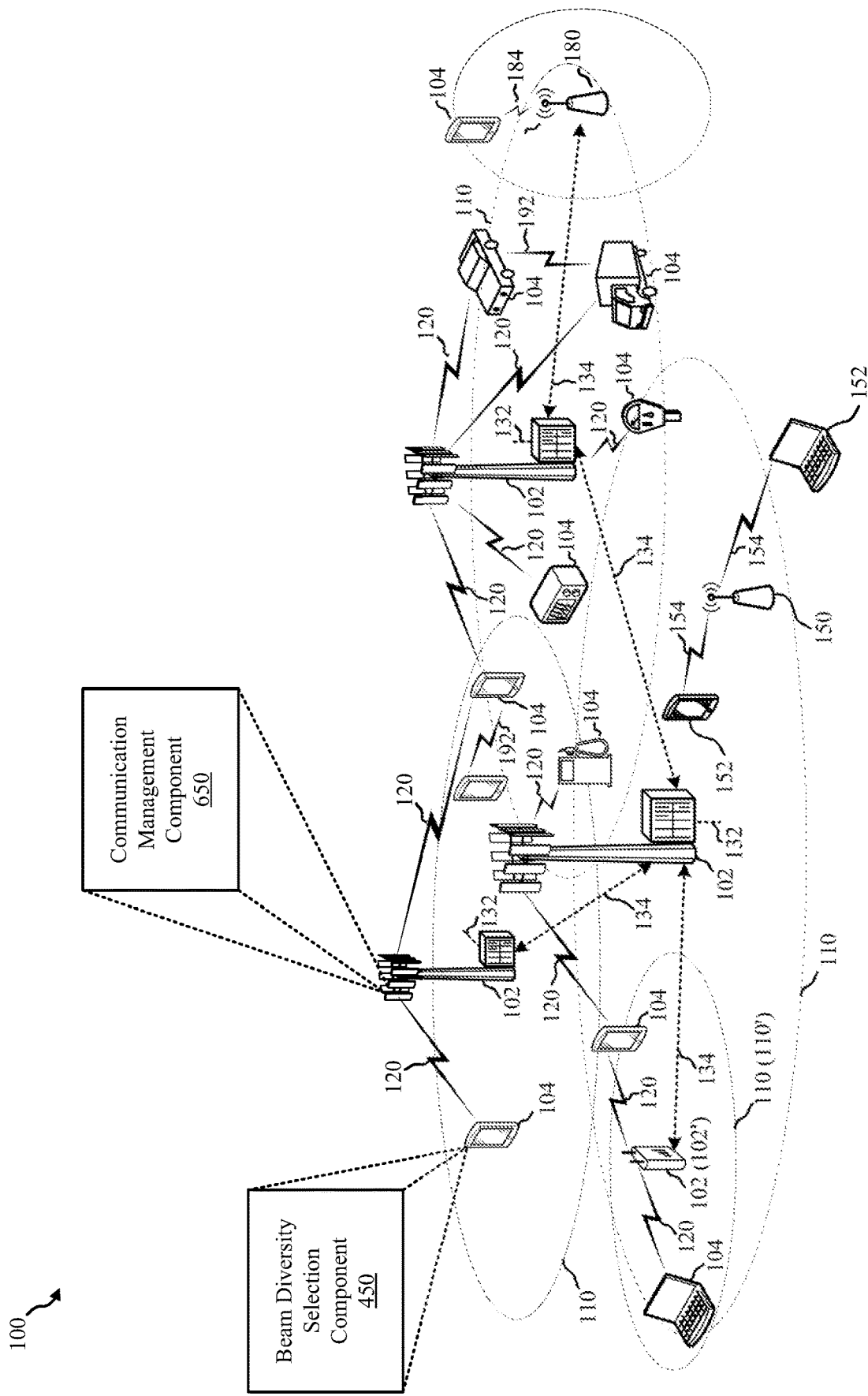
FIG. 1 illustrates an example of a wireless communications system in accordance with aspects of the present disclosure.

As discussed above, one aspect of the 5G NR communications technology includes the use of high-frequency spectrum bands above 24 GHz, which may be referred to as mmW. The use of these bands enables extremely high data rates and significant increases in data processing capacity. However, mmW bands are susceptible to rapid channel variations and suffer from severe free-space path loss and atmospheric absorption. In addition, mmW bands are highly vulnerable to blockage (e.g. hand, head, body, foliage, building penetration). Particularly, at mmW frequencies, even small variations in the environment, such as the turn of the head, movement of the hand, or a passing car, can change the channel conditions between the base station and the UE, and thus impact communication performance.

Current mmW 5G NR systems leverage the small wavelengths of mmW at the higher frequencies to make use of massive multiple input multiple output (MIMO) antenna arrays to create highly directional beams that focus transmitted radio frequency (RF) energy in order to attempt to overcome the propagation and path loss challenges in both the uplink and downlink links. In some implementations, a base station may transmit a plurality of directional candidate beams towards the desired UE for communication. In turn, the UE may measure Reference Signals Received Power (RSRP) of each candidate beam to identify one or more beams that maximize receiver signal to noise ratio (SNR) per Transmission Configuration Indication (TCI) state. Based on the RSRP measurements, the base station and the UE may select one or more beams from a plurality of candidate beams for use in communication. Cases where multiple TCIs or beams are chosen may be referred to as multi-TCI or multi-beam operation, and this type of operation may be used to increase reliability as the use of multiple TCIs or beams improves robustness and resilience to blocking.

Reliance on the RSRP measurements alone to select a candidate beam, however, fails to enforce beam diversity to ensure robustness against short-term and long-term fading. Specifically, if one or more candidate beams for communication are selected exclusively based on RSRP measurements performed at one instance of time, any variations in channel may cause the selected beam to be blocked from reaching the UE. For example, once a candidate beam is identified and selected, the UE may move to a new location where the selected mmW beam may be blocked by, for example, a tree, building, or even a hand movement. In such instances, not only would the selected beam, but also other beams having similar characteristics may also be blocked, as such beams typically have correlated RSRPs. The blockage of the selected mmW beams may increase communication overhead between the base station and the UE due to retransmissions requirements of the blocked signal(s).

Aspects of the present disclosure provide techniques to improve reliability and robustness for mmW systems in 5GNR communications technology by allowing the base station to group a plurality of mmW beams for communication with the UE such that the selected beam(s) for communication have improved independence and reduced correlation. Particularly, the techniques outlined herein allow for selection of beams that ensure macro-diversity in that the joint blocking probability of the selected beam(s) may be minimized and the susceptibility to blockage is reduced in comparison to the current systems.

For example, in one implementation, a user equipment (UE) reports to a base station (e.g., a gNB) beam indices that the UE considers are best to ensure robust reception. In this implementation, the gNB may first request beam indices from the UE for reliability, such as but not limited to via a protocol layer parameter or downlink control information (DCI) and/or a medium access control layer control element (MAC-CE). In response, the UE selects beams depending on UE capabilities and/or hardware limitations, such as based on a reliability metric, parameters, thresholds, or algorithms that may be configured for the UE. Examples of such a reliability metric, parameters, thresholds, or algorithms may be related to beam correlation information for metrics such as, but not limited to, RSRP, angle of arrival (AoA), and/or spatial correlation.

In another example, the gNB may explicitly exercise control over how the UE choses the beams by setting the reliability metric, parameters, thresholds, or algorithms for use by the UE.

In a further example, the gNB may request one or more additional reports from the UE for the purpose of determining beam groupings. The additional report may include correlation metrics or AoA information in addition to RSRPs of the beams. Based on the information in the additional reports, the gNB may group similar (e.g., substantially correlated) TCI states or beams.

Therefore, the present solutions provide for TCI state or beam grouping based on correlation of one or more beam metrics, enabling TCI states or beams to be chosen from different groupings in order to improve reliability of communications between the UE and the gNB.

Various aspects are now described in more detail with reference to the FIGS. 1-7. In the following description, for purposes of explanation, numerous specific details are set forth in order to provide a thorough understanding of one or more aspects. It may be evident, however, that such aspect(s)

may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 is a diagram illustrating an example of a wireless communications system and an access network 100. The wireless communications system 100 may include one or more base stations 102, one or more UEs 104, and a core network. The core network may provide user authentication, access authorization, tracking, internet protocol (IP) connectivity, and other access, routing, or mobility functions. The base stations 102 may perform radio configuration and scheduling for communication with the UEs 104, or may operate under the control of a base station controller (not shown). In various examples, the base stations 102 may communicate, either directly or indirectly (e.g., through core network), with one another over backhaul links 134 which may be wired or wireless communication links.

The base stations 102 may wirelessly communicate with the UEs 104 via one or more base station antennas. The base station 102 may include a communication management component 650 (see FIG. 6) for grouping one or more mmW beams based on correlation information to ensure reliability and robustness in multi-TCI or multi-beam operations. To this end, the communication management component 650 may include a beam grouping component 655 that may either group one or more beams based on the beam indices or based on beam measurement reports received from the UE 104 (see FIG. 3). In some aspects, the beam grouping may be achieved by identifying one or more of RSRP-correlation by RSRP-correlation component 660, AoA separation by AoA separation component 665, and spatial correlation by spatial correlation component 670 based on one or more beam measurement reports. In some aspects, the beam grouping component 655 may group one or more beams into a plurality of TCI states based on the characteristics and the similarities (or differences) between the plurality of the beams identified in the beam measurement report(s).

Each of the base stations 102 may provide communication coverage for a respective geographic coverage area 110. In some examples, base stations 102 may be referred to as a base transceiver station, a radio base station, an access point, an access node, a radio transceiver, a NodeB, eNodeB (eNB), gNB, Home NodeB, a Home eNodeB, gNodeB (gNB), a relay, or some other suitable terminology. The geographic coverage area 110 for a base station 102 may be divided into sectors or cells making up only a portion of the coverage area (not shown). The wireless communication network 100 may include base stations 102 of different types (e.g., macro base stations 102 or small cell base stations 180, described below).

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. The wireless communication network 100 may be a heterogeneous technology network in which different types of base stations provide coverage for various geographical regions. For example, each base station 102 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 104 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 104 with service subscriptions with the network provider. A femto cell may also cover a small geographic area (e.g., a home) and may provide restricted access and/or unrestricted access by UEs 104 having an association with the femto cell (e.g., in the restricted access case, UEs 104 in a closed subscriber group (CSG) of the base station 102, which may include UEs 104 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 104 may be dispersed throughout the wireless communication network 100, and each UE 104 may be stationary or mobile. The UEs 104 may include a beam diversity selection component 450 (see FIGS. 3 and 4) to perform one or more functions of beam selection in accordance with aspects of the present disclosure. In some examples, as described with reference to FIGS. 3 and 4 (infra), the beam diversity selection component 450 may include an RSRP-correlation component 455 for measuring RSRP correlation between a plurality of mmW beams. The beam diversity selection component 450 may further include an AoA separation component 460 for determining AoAs of beams and identifying whether two or more beams satisfy an AoA separation threshold. The beam diversity selection component 450 may further include a spatial correlation component 465 for determining spatial correlation of beams and ensuring that two or more beams are statistically independent and distributed. Depending on the implementation, the beam diversity selection component 450 may include all of RSRP-correlation component 455, AoA separation component 460, and spatial correlation component 465, while in other implementations only a subset may be included. Thus, the beam diversity selection component 450 operates to identify substantially uncorrelated beams such that multiple independent channels with substantially uncorrelated characteristics can be created and be used for either transmitting multiple data streams or increasing the reliability (e.g., in terms of low bit error rate).

A UE 104 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 104 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 104 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 104 may be able to communicate with various types of base stations 102 and network equipment including macro eNBs, small cell eNBs, macro gNBs, small cell gNBs, gNB, relay base stations, and the like.

UE 104 may be configured to establish one or more wireless communication links 120 with one or more base stations 102. The wireless communication links 120 shown in wireless communication network 100 may carry uplink (UL) transmissions from a UE 104 to a base station 102, or downlink (DL) transmissions, from a base station 102 to a UE 104. Each wireless communication link 120 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 120 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 120 may represent one or more broadcast channels.

In some aspects of the wireless communication network 100, base stations 102 or UEs 104 may include multiple antennas for employing antenna diversity schemes to improve communication quality and reliability between base stations 102 and UEs 104. Additionally or alternatively, base stations 102 or UEs 104 may employ multiple input multiple output (MIMO) techniques that may take advantage of multi-path environments to transmit multiple spatial layers carrying the same or different coded data.

Wireless communication network 100 may also support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 104 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communication network 100 may further include base stations 102 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 102 and/or UEs 104 may operate according to millimeter wave (mmW or mmWave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 102 and/or UEs 104 operating according to the mmW technology may utilize beamforming in their transmissions to compensate for the extremely high path loss and short range.

Figure 2:
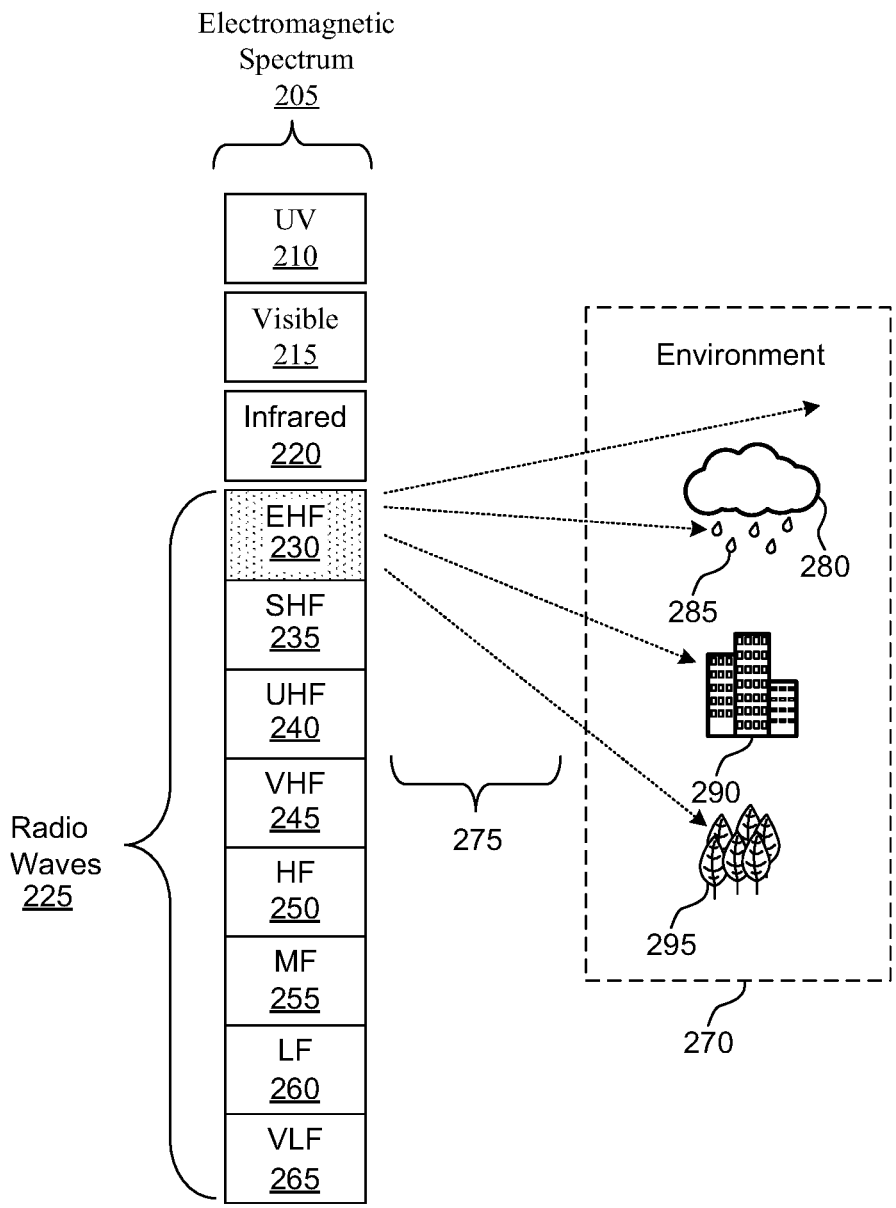
FIG. 2 illustrates an example spectrum diagram that illustrates aspects of the frequency range in which some of the communications described herein are performed in accordance with aspects of the present disclosure.

FIG. 2 illustrates a spectrum diagram 200 that illustrates aspects of the frequency range in which some of the communications described herein are performed in accordance with aspects of the present disclosure. Spectrum diagram 200 may include the following components: electromagnetic spectrum 205 and environment 270.

In some examples, electromagnetic spectrum 205 may include the following components: ultra-violet (UV) radiation 210, visible light 215, infrared radiation 220, and radio waves 225. The mmW (or extremely high frequency (EHF)) portion of the electromagnetic spectrum corresponds to electromagnetic radiation with a frequency of 30-300 GHz and a wavelength between 1 mm and 1 cm. Near MMW may extend down to a frequency of 3 GHz with a wavelength of 100 millimeters.

In some examples, radio waves 225 may include the following components: EHF band 230, super high frequency (SHF) band 235, ultra-high frequency (UHF) band 240, very high frequency (VHF) band 245, high frequency (HF) band 250, medium frequency (MF) band 255, low frequency (LF) band 260, and very low frequency (VLF) band 265. The EHF band 230 lies between the SHF band 235 and the far infrared band 220. The SHF band 235 may also be referred to as the centimeter wave band. In some examples, environment 270 may include the following components: mmW radiation 275, atmosphere 280, rain 285, obstacle 290, and foliage 295.

In some examples, the wireless communication system 100 may be a mmW communication system. The mmW communication systems may include transmissions in mmW frequencies and/or near mmW frequencies. In mmW communication systems (e.g., access network 100), a line of sight (LOS) may be needed between a transmitting device (e.g., base station 102) and a receiving device (e.g., UE 104), or between two UEs 104. Frequency is very high in mmW communication systems which means that beam widths are very small, as the beam widths are inversely proportional to the frequency of the waves or carriers transmitted by an antenna of the transmitting device. Beam widths used in mmW communications are often termed as "pencil beams." The small wavelengths may result in many objects or materials acting as obstacles including even oxygen molecules. Therefore, LOS between the transmitter and receiver may be required unless a reflected path is strong enough to transmit data. Further, in some examples, base stations may track UEs 104 to focus beams for communication.

During LOS situations, tracking of the UE 104 may be performed by the base station 102 or another UE 104 by focusing a beam onto the tracked UE 104. However, if the receiving UE 104 is in a Non-Line of Sight (NLOS) position, then a transmitter of the base station 102 may need to search for a strong reflected path which is not always available. An example of a UE 104 being in a NLOS position may include a first UE 104 located within a vehicle. When the first UE 104 is located within the vehicle, a base station 102 may have difficulty retaining LOS and the difficulty of retaining LOS may further increase when the vehicle is moving.

Further, compared to lower frequency communication systems, a distance between base stations 102 in a mmW communication system may be very short (e.g., 150-200 meters between gNBs). The short distances may result in a short amount of time required for a handover between base stations 102. The short distance and the fast handovers may cause difficulty to the base station 102 in maintaining a LOS beam on a UE 104 when the UE 104 is, for example, located within a vehicle as even small obstacles like a user's finger on the UE 104 or the vehicle windows or windshield act as obstacles to maintaining the LOS.

Thus, as discussed above, communications using the mmW and/or near mmW radio frequency band may have extremely high path loss and a short range. Specifically, while the use of these bands is compelling as the large bandwidths available at these high frequencies enable extremely high data rates and significant increases in capacity, mmW bands are highly susceptible to rapid channel variations and suffer from severe free-space path loss and atmospheric absorption, including blockage (e.g. hand, head, body, foliage, building penetration). In other words, at mmW frequencies, even small variations in the environment, such as the turn of the head, movement of the hand, or a passing car can change the channel conditions between the base station and the UE, and thus impact performance.

As such, base stations 102 and/or UEs 104 operating according to the mmW technology may utilize beamforming (see FIG. 3) in their transmissions to compensate for the extremely high path loss and short range. Particularly, the 5G NR systems may leverage the massive MIMO antenna arrays to create highly directional beams of small wavelengths that focus transmitted RF energy in order to attempt to overcome the propagation and path loss challenges in both the uplink and downlink. In some aspects of the wireless communication network 100, base stations 102 or UEs 104 may include multiple antennas for employing antenna diversity schemes to improve communication quality and reliability between base stations 102 and UEs 104. Thus, the base stations 102 or UEs 104 may employ MIMO techniques that may take advantage of multi-path environments to transmit multiple spatial layers carrying the same or different coded data.

Figure 3:
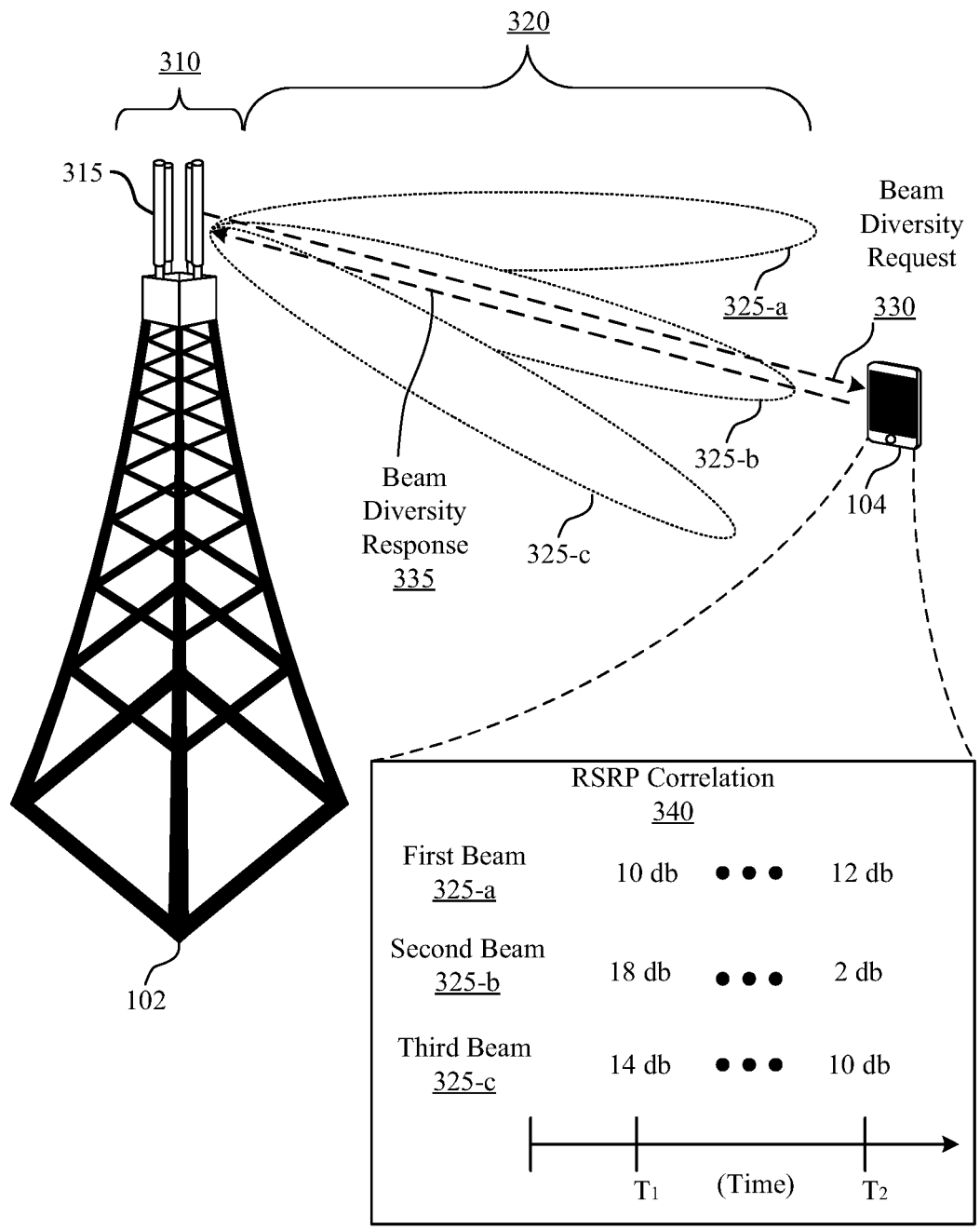
FIG. 3 illustrates an example schematic diagram that supports beam grouping and selection in accordance with aspects of the present disclosure.

FIG. 3 illustrates a schematic diagram 300 that supports beam grouping and selection procedure to ensure beam diversity in accordance with aspects of the present disclosure. Specifically, beamforming is a technique for directional signal transmission and reception. Schematic diagram 300 illustrates an example of beamforming operations, and may include a base station 102, beamforming array 310, and UE 104.

In some examples, the beamforming array 310 of the base station 102 may include one or more antennas 315 for employing MIMO techniques that may take advantage of multi-path environments to transmit multiple spatial layers carrying the same or different coded data. Beamforming at a transmitter (e.g., base station 102 or UE 104) may involve phase-shifting the signal produced at different antennas 315 in an array to focus a transmission in a particular direction. The phase-shifted signals may interact to produce constructive interference in certain directions and destructive interference in other directions. By focusing the signal power, a transmitter may improve communication throughput while reducing interference with neighboring transmitters.

Similarly, beamforming at a receiver may involve phase-shifting a signal received from different antennas 315. When combining the phase shifted signals, the receiver may amplify a signal from certain directions and reduce the signal from other directions. In some cases, receivers and transmitters may utilize beamforming techniques independently of each other. In other cases, a transmitter and receiver may coordinate to select a beam direction. The use of beamforming may depend on factors such as the type of signal being transmitted and the channel conditions. For example, directional transmissions may not be useful when transmitting to multiple receivers, or when the location of the receiver is unknown. Thus, beamforming may be appropriate for unicast transmissions, but may not be useful for broadcast transmissions. Also, beamforming may be appropriate when transmitting in a high frequency radio band, such as in the mmW band.

Since the beamforming array 310 size is proportional to the signal wavelength, smaller devices (e.g., UEs) may also be capable of beamforming in high frequency bands. Also, the increased receive power may compensate for the increased path loss at these frequencies. In some examples, beamforming pattern 320 may include one or more beams 325, which may be identified by individual beam IDs (e.g., first beam 325-a, second beam 325-b, third beam 325-c, etc.).

Generally, in systems such as 5G NR mmW systems, a base station 102 may transmit a plurality of directional candidate beams 325 (e.g., 325-a, 325-b, 325-c) towards the desired UE 104 for communication. In turn, the UE 104 may measure RSRP of each candidate beam 325 to identify one or more beams that maximize receiver SNR per TCI state. Based on the RSRP measurements, the base station 102 and the UE 104 may select one or more beams (e.g., first beam 325-a) from a plurality of candidate beams 325. Cases where multiple TCIs or beams are chosen may be referred to as multi-TCI or multi-beam operation, and this type of operation may be used to increase reliability as the use of multiple TCIs or beams improves robustness and resilience to blocking.

However, as noted above, reliance on the RSRP measurements alone to select a candidate beam fails to enforce beam diversity to ensure robustness against short-term and long-term fading, as RSRP measurements alone do not identify a correlation, e.g., a similarity or difference of RSRP over time or of AoA or of spatial characteristics, between the TCI states or beams. Specifically, if one or more candidate beams 325 for communication are selected based on RSRP measurements performed at one instance of time, any variations in channel condition may cause the selected beams to be blocked from reaching the UE. For example, once a candidate beam is identified and selected (e.g., first beam 325-a), the UE may move to a location such that the selected mmW beam may be blocked by a tree, building, or even a hand movement. In such instance, not only the selected beam 325-a, but also other beams having similar characteristics (e.g., second beam 325-b) that were identified as providing improved SNR may also be blocked. For example, regarding the impact of blocking, depending on the blockage model, multiple beam clusters may be affected by a single blocker and/or correlated blockers. In this case, for instance, two good/top beams may get blocked. Further, in this type of blocking situation, the effective number of beam clusters and AoA may be different before and after blocking. In any case, the blockage of the selected mmW beams in multi-TCI or multi-beam operation may increase communication overhead between the base station and the UE due to retransmissions of the blocked signal.

Aspects of the present disclosure may provide techniques to improve reliability and robustness for mmW systems by allowing the base station 102 to group a plurality of mmW beams for communication with the UE 104 such that the selected beam(s) for communication are independent and uncorrelated. These techniques may be particularly effective in multi-TCI or multi-beam operation. It should be appreciated by those of ordinary skill in the art that the present invention is not just limited to mmW, but may also include any other frequencies used for wireless communication.

In some examples, in order to facilitate beam grouping per TCI state, the base station 102 may request beam indices from the UE for beam reliability. In other examples, the base station 102 may request beam measurement reports from the UE in order to facilitate beam grouping at the base station. Based on the beam indices and/or measurement reports that are received from the UE 104, the base station may group one or more mmW beams into one or more TCI states. In some examples, a TCI state may indicate to a UE a transmission configuration which identifies the one or more mmW beams that the UE may configure for communication with the base station. Additionally, the TCI state may include QCL-relationships between the downlink reference signals and the Physical Downlink Shared Channel (PDSCH) demodulation reference signal (DMRS) ports. In some aspects, a single UE may be RRC configured with a plurality of M candidate TCI states for the purposes of QCL indication.

In one example, in order to group the one or more mmW beams while ensuring robustness and diversity, the base station 102 may transmit a beam diversity request 330 to the UE 104. The beam diversity request 330 may include either a request for the UE to identify one or more beam indices (e.g., beam IDs) that are independent and uncorrelated such that a joint blocking probability of the selected beams is minimized. In some aspects, the UE 104 may select one or more beam indices from the beamforming pattern 320 that includes one or more beams 325, which may be identified by individual beam IDs (e.g., first beam 325-a, second beam 325-b, third beam 325-c, etc.).

Upon receiving the beam diversity request 330, the UE 104, and more particularly the beam diversity selection component 450 (see FIG. 4) of the modem 414 in the UE 104, may determine one or more of factors that may contribute towards robustness and diversity of beam selection. In some examples, the one or more factors may include, but not be limited to, RSRP correlation, angle of arrival (AoA) separation, and/or spatial correlation of the one or more beams 325. It should be appreciated that the UE 104 may consider each of the above three factors individually or in collaboration in order to select one or more beams that provide the greatest diversity and robustness.

Determining RSRP correlation 340 may include the RSRP-correlation component 455 (see FIG. 4) measuring, at the UE 104, the RSRP of each received beam 325 in the beamforming pattern 320 at multiple instances of time during a monitoring period 345 (FIG. 3). In some examples, the "monitoring period" may be periodic such that the measurements may be performed over time to confirm that channel conditions have not varied such that selection of new beam may be necessitated. In contrast to the current systems that select a beam 325 based on a single RSRP measurement that offers the greatest SNR, features of the present disclosure measure RSRP of each received beam 325 over a period of time in order to identify correlation between the plurality of beams 325. For example, referring to FIG. 3, the UE 104 at a first time period ($T_1$) may measure RSRP of the first beam 325-a as 10 decibel (db), the second beam 325-b as 18 db, and third beam 325-c at 14 db. In current systems, the UE 104 may select the second beam 325-b for communication given that the second beam 325-b at the first time period provides the highest RSRP of the plurality of beams 325. However, features of the present disclosure provide improvements on this system by conducting subsequent RSRP measurements of each beam 325 at the second time period ($T_2$) in order to identify RSRP correlation between the beams 325.

In the illustrated instance, during the second time period ($T_2$), the RSRP measurements of the first beam 325-a may be 12 db ($\Delta=-3$ db), the second beam 325-b may be 2 db ($\Delta=-16$ db), and third beam 325-c may be 10 db ($\Delta=-4$ db). Given the steep decline in the RSRP measurement between the first time period and the second time period for the second beam 325-b, the UE 104 may be able to determine that the second beam 325-b, while initially offering the strongest RSRP measurements, may be susceptible to path loss or blockage. As such, the UE 104 may identify the first beam 325-a and the third beam 325-c as beams that offer greater reliability and diversity. In some aspects, the base station 102 may configure the RSRP-correlation threshold and provide the RSRP-correlation threshold information to the UE 104. Accordingly, the UE may report beam indices of one or more beams 325 that satisfy the RSRP-correlation threshold (e.g., report beams whose correlation is below the RSRP-correlation threshold).

Additionally or alternatively, the UE 104, and more particularly the AoA separation component 460 (see FIG. 4) of the UE 104, may determine AoA separation of the two or more beams. AoA separation may include identifying two or more beams that satisfy an AoA separation threshold in order to ensure that the AoA of the first beam 325-*a* and the third beam 325-*c*, for example, is sufficiently different such that if the first beam 325-*a* is blocked due to an obstacle there is a high probability of the third beam 325-*c* may successfully reach the UE 104. Indeed, if multiple beams 325 present similar (or close to similar) AoA (e.g., the separation is less than the AoA separation threshold), there may be a greater likelihood of joint blocking of multiple beams that may adversely impact communication performance. In some aspects, the base station 102 may configure the AoA separation threshold and provide the AoA separation threshold information to the UE 104. Accordingly, the UE may report beam indices of one or more beams 325 that satisfy the AoA separation threshold (e.g., the AoA of a beam exceeds the AoA separation threshold configured by the base station 102 for the UE 104).

Spatial correlation may refer to a signal's spatial direction and the average received signal gain of the two or more beams 325. Particularly, spatial correlation may ensure that the two or more beams 325 are statistically independent and distributed such that multiple independent channels with identical characteristics can be created and be used for either transmitting multiple data streams or increasing the reliability (e.g., in terms of low bit error rate). To this end, spatial correlation component 465 (see FIG. 4) may identify the spatial correlation between the two or more beams 325. In some aspects, the base station 102 may configure the spatial-correlation threshold and provide the spatial-correlation threshold information to the UE 104. Accordingly, the UE may report beam indices of one or more beams 325 that satisfy the spatial-correlation threshold (e.g., the UE 104 may report beam indices for beams whose spatial correlation is less than the spatial-correlation threshold).

Based on the calculations of one or more of RSRP correlation, AoA separation, and the spatial correlation, the UE 104 may identify one or more beams that the UE may consider to provide robust reception. Accordingly, UE 104 may report the identified beams in a beam diversity response 335 to the base station 102 such that the base station 102 may group the identified beams (e.g., first beam 325-*a* and third beam 325-*c*) into separate TCI states. The base station 104 may further transmit TCI state information to the UE 104 in order allow the UE 104 to be configured for subsequent communication based on the beams 325 identified in the TCI states. It should be noted that in some examples, the UE 104 may be configured with multiple TCI states, each TCI state identifying one or more different beams 325. In some examples, the selection of the one or more beams 325 based on combination of RSRP correlation, AoA separation, and the spatial correlation may be controlled by the base station 102 by setting one or more thresholds (e.g., RSRP-correlation threshold, AoA separation threshold, or spatial-correlation threshold) such that the reliability metrics are satisfied.

In another example, the base station 102 may request the UE 104 to provide measurement reports to the base station 102 that identify beam indices based on a base station-defined configuration to identify the one or more beam indices that provide greatest robustness. In such implementation, the base station 102 and not the UE 104 may control the selection and grouping of the beams into one or more TCI states based on the measurement reports that may be received from the UE 104. In such instance, the base station 102 may transmit a beam diversity request 330 to the UE 104 that may request the UE 104 to provide beam measurement reports to the base station 102. In some examples, the beam measurement reports may include one more identifiers of which metric, threshold, parameter, and/or algorithm to use, such as corresponding to the measured RSRP correlation metrics, spatial correlation metrics, and/or AoA separation or correlation of the one or more beams 325. The UE 104 may perform measurements on each received beam 325 based on base station-defined metric, threshold, parameter, and/or algorithm and provide a beam measurement report in the UE beam diversity response 335 to the base station 102 via the measurement reporting component 470 (see FIG. 4). In some instances, the UE beam diversity response 335 may further include information associated with the UE 104 hardware capabilities and limitations to assist the base station 102 in grouping the beams 325 in one or more TCI states. For example, in one option, the base station 102 configures an angle threshold and the UE 104 reports beam indices that differ by more than that configured threshold. In another option, for example, the base station 104 configures a threshold for RSRP-correlation and the UE 104 reports beams whose correlation is below the threshold. In a further option, for example, the base station 104 configures a threshold for a spatial correlation metric and the UE 104 reports beams whose correlation is below the threshold. Based on the measurement reports, the base station may group the one or more beams 325 into one or more TCI states in order to ensure robustness of each scheduled UE 104 in the coverage area 110 of the base station 102. In some aspects, beams with "similar" characteristics (e.g., similar AoA, RSRP correlation, and/or spatial-correlation) may be grouped together into the same TCI state.

Figure 4:
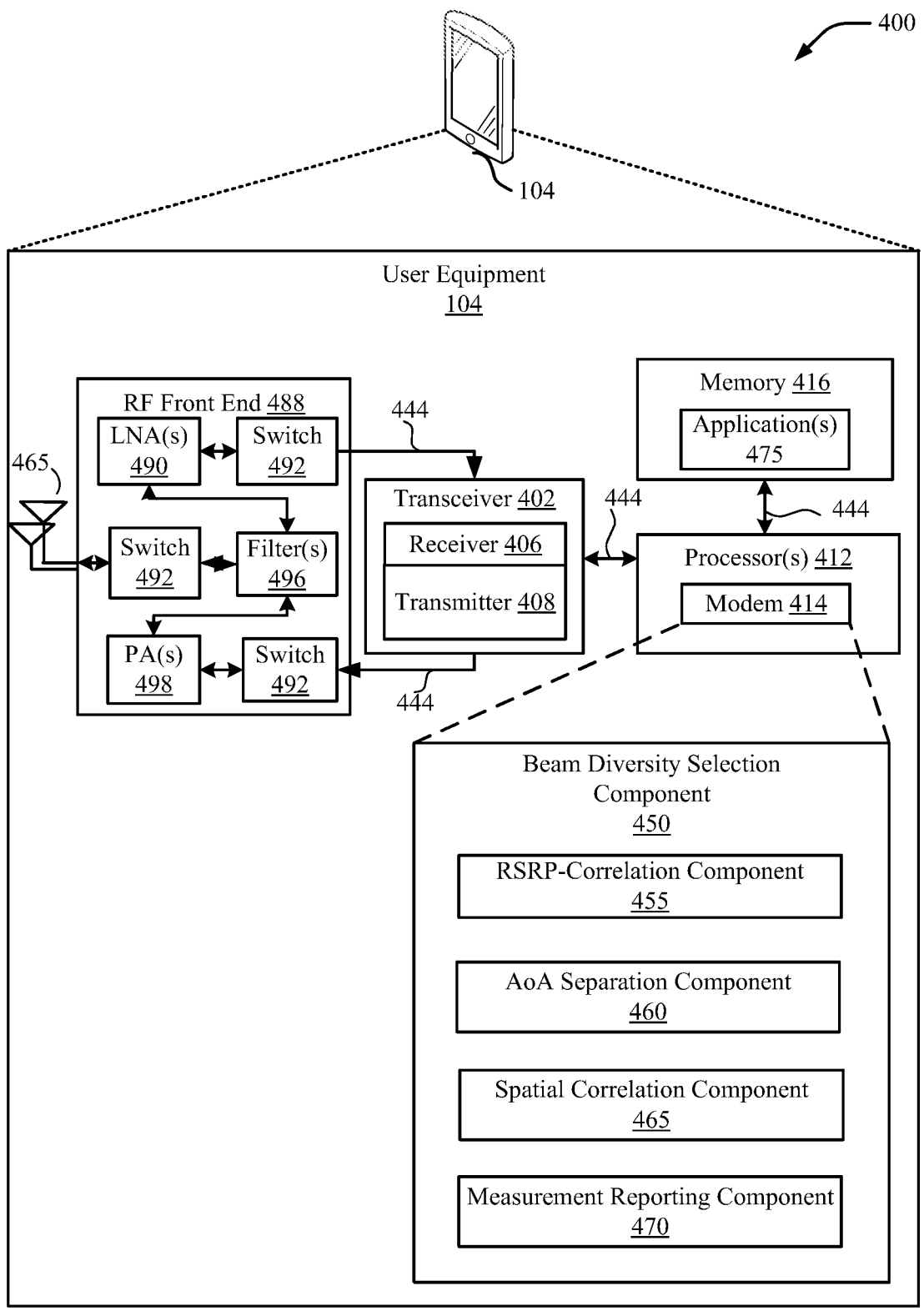
FIG. 4 illustrates an example of a schematic diagram of an aspect of an implementation of various components of a UE in accordance with various aspects of the present disclosure.

FIG. 4 illustrates a hardware components and subcomponents of a device that may be a UE 104 for implementing one or more methods (e.g., method 500) described herein in accordance with various aspects of the present disclosure. For example, one example of an implementation of the UE 104 may include a variety of components, some of which have already been described above, but including components such as one or more processors 412, memory 416 and transceiver 402 in communication via one or more buses 444, which may operate in conjunction with the beam diversity selection component 450 to perform functions described herein related to including one or more methods (e.g., 500) of the present disclosure.

In some examples, the beam diversity selection component 450 may include an RSRP-correlation component 455 for measuring RSRP correlation between a plurality of mmW beams. The beam diversity selection component 450 may further include an AoA separation component 460 for identifying whether the two or more beams satisfy AoA separation threshold configured by the base station 102. The beam diversity selection component 450 may further include a spatial correlation component 465 for ensuring that the two or more beams are statistically independent and distributed such that multiple independent channels with identical characteristics can be created and be used for either transmitting multiple data streams or increasing the reliability (e.g., in terms of low bit error rate).

The one or more processors 412, modem 414, memory 416, transceiver 402, RF front end 488 and one or more antennas 465, may be configured to support voice and/or data calls (simultaneously or non-simultaneously) in one or more radio access technologies. In an aspect, the one or more processors 412 can include a modem 414 that uses one or more modem processors. The various functions related to beam diversity selection component 450 may be included in modem 414 and/or processors 412 and, in an aspect, can be executed by a single processor, while in other aspects, different ones of the functions may be executed by a combination of two or more different processors. For example, in an aspect, the one or more processors 412 may include any one or any combination of a modem processor, or a baseband processor, or a digital signal processor, or a transmit processor, or a receiver processor, or a transceiver processor associated with transceiver 402. In other aspects, some of the features of the one or more processors 312 and/or modem 414 associated with beam diversity selection component 450 may be performed by transceiver 402.

The memory 416 may be configured to store data used herein and/or local versions of application(s) 475 or beam diversity selection component 450 and/or one or more of its subcomponents being executed by at least one processor 412. The memory 416 can include any type of computer-readable medium usable by a computer or at least one processor 412, such as random access memory (RAM), read only memory (ROM), tapes, magnetic discs, optical discs, volatile memory, non-volatile memory, and any combination thereof. In an aspect, for example, the memory 416 may be a non-transitory computer-readable storage medium that stores one or more computer-executable codes defining beam diversity selection component 450 and/or one or more of its subcomponents, and/or data associated therewith, when the UE 104 is operating at least one processor 412 to execute beam diversity selection component 450 and/or one or more of its subcomponents.

The transceiver 402 may include at least one receiver 406 and at least one transmitter 408. The receiver 406 may include hardware, firmware, and/or software code executable by a processor for receiving data, the code comprising instructions and being stored in a memory (e.g., computer-readable medium). The receiver 406 may be, for example, a radio frequency (RF) receiver. In an aspect, the receiver 406 may receive signals transmitted by at least one UE 104. Additionally, receiver 406 may process such received signals, and also may obtain measurements of the signals, such as, but not limited to, Ec/Io, SNR, RSRP, RSSI, etc. The transmitter 408 may include hardware, firmware, and/or software code executable by a processor for transmitting data, the code comprising instructions and being stored in a memory (e.g., computer-readable medium). A suitable example of the transmitter 408 may including, but is not limited to, an RF transmitter.

Moreover, in an aspect, transmitting device may include the RF front end 488, which may operate in communication with one or more antennas 465 and transceiver 402 for receiving and transmitting radio transmissions, for example, wireless communications transmitted by at least one base station 102 or wireless transmissions transmitted by UE 104. The RF front end 488 may be connected to one or more antennas 465 and can include one or more low-noise amplifiers (LNAs) 490, one or more switches 492, one or more power amplifiers (PAs) 498, and one or more filters 496 for transmitting and receiving RF signals.

In an aspect, the LNA 490 can amplify a received signal at a desired output level. In an aspect, each LNA 490 may have a specified minimum and maximum gain values. In an aspect, the RF front end 488 may use one or more switches 492 to select a particular LNA 490 and its specified gain value based on a desired gain value for a particular application.

Further, for example, one or more PA(s) 498 may be used by the RF front end 488 to amplify a signal for an RF output at a desired output power level. In an aspect, each PA 398 may have specified minimum and maximum gain values. In an aspect, the RF front end 488 may use one or more switches 492 to select a particular PA 498 and its specified gain value based on a desired gain value for a particular application.

Also, for example, one or more filters 496 can be used by the RF front end 488 to filter a received signal to obtain an input RF signal. Similarly, in an aspect, for example, a respective filter 496 can be used to filter an output from a respective PA 398 to produce an output signal for transmission. In an aspect, each filter 496 can be connected to a specific LNA 490 and/or PA 498. In an aspect, the RF front end 488 can use one or more switches 492 to select a transmit or receive path using a specified filter 496, LNA 490, and/or PA 498, based on a configuration as specified by the transceiver 402 and/or processor 412.

As such, the transceiver 402 may be configured to transmit and receive wireless signals through one or more antennas 465 via the RF front end 388. In an aspect, the transceiver 402 may be tuned to operate at specified frequencies such that transmitting device can communicate with, for example, one or more base stations 102 or one or more cells associated with one or more base stations 102. In an aspect, for example, the modem 414 can configure the transceiver 402 to operate at a specified frequency and power level based on the configuration of the transmitting device and the communication protocol used by the modem 414.

In an aspect, the modem 414 can be a multiband-multimode modem, which can process digital data and communicate with the transceiver 402 such that the digital data is sent and received using the transceiver 402. In an aspect, the modem 414 can be multiband and be configured to support multiple frequency bands for a specific communications protocol. In an aspect, the modem 414 can be multimode and be configured to support multiple operating networks and communications protocols. In an aspect, the modem 414 can control one or more components of transmitting device (e.g., RF front end 488, transceiver 402) to enable transmission and/or reception of signals from the network based on a specified modem configuration. In an aspect, the modem configuration can be based on the mode of the modem 414 and the frequency band in use. In another aspect, the modem configuration can be based on UE configuration information associated with transmitting device as provided by the network during cell selection and/or cell reselection.

Figure 5:
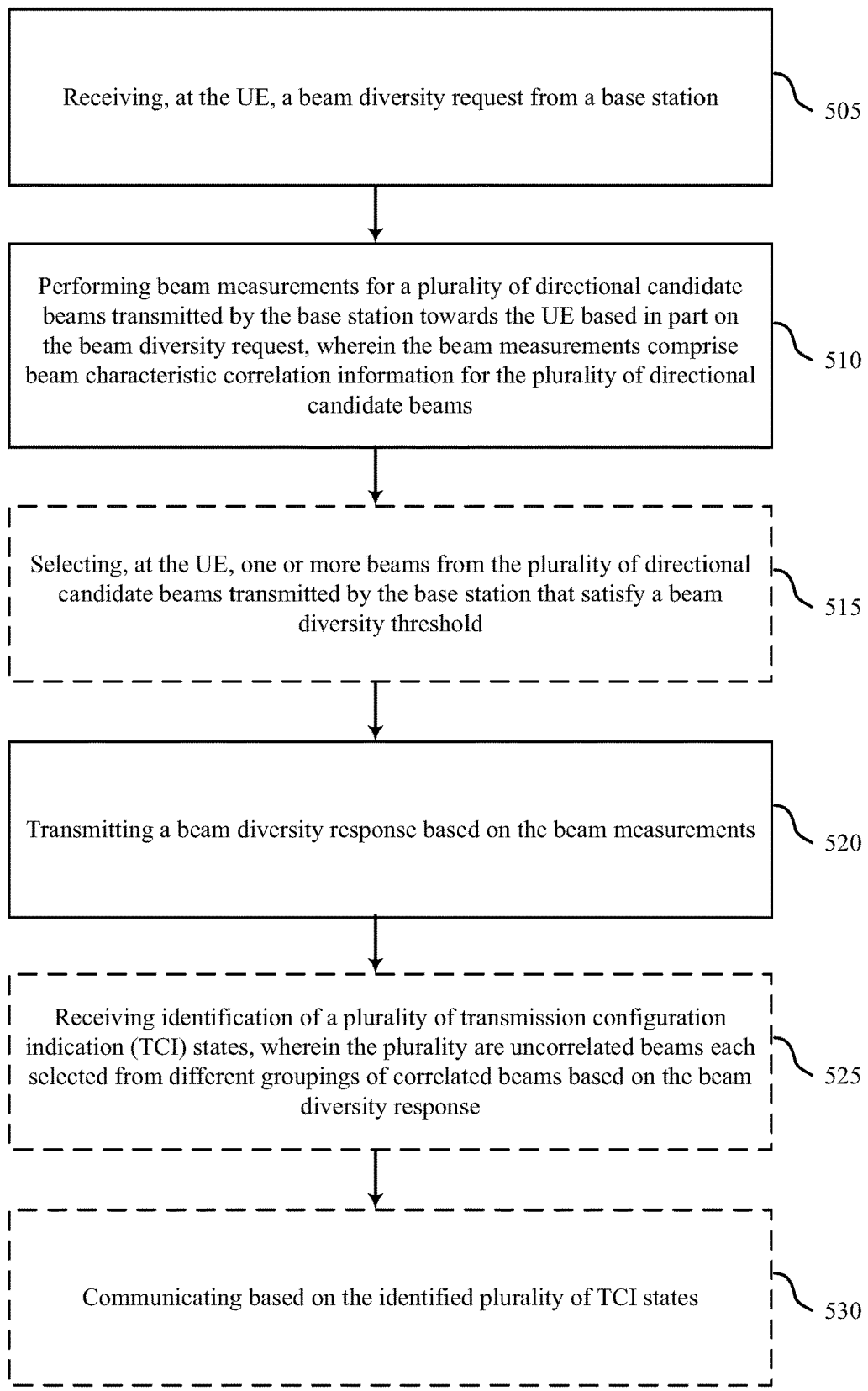
FIG. 5 illustrates an example of a method of wireless communication implemented by the UE in accordance with aspects of the present disclosure.

FIG. 5 is a flowchart of an example method 500 for wireless communications in accordance with aspects of the present disclosure. The method 500 may be performed using the UE 104. Although the method 500 is described below with respect to the elements of the UE 104, other components may be used to implement one or more of the steps described herein.

At block 505, the method 500 may include receiving, at the UE, a beam diversity request from a base station. For example, in an aspect, transceiver 402 may receive the beam diversity request from the RF front end 488 and forward the received message to the modem 414 of the UE 104. In some examples, the beam diversity request triggers the UE to identify one or more beams that may provide robustness connectivity based on beam characteristic correlation information. In some examples, the beam diversity request from the base station may include information associated with one or more of RSRP-correlation threshold, AoA separation threshold, or spatial-correlation threshold that the beam measurements must satisfy to be included in the beam diversity response. The information associated with the one or more thresholds may be used to configure the UE to report beams that satisfy the thresholds configured by the base station. Aspects of block 505 may be performed by transceiver 402 described with reference to FIG. 4.

At block 510, the method 500 may include performing beam measurements for a plurality of directional candidate beams transmitted by the base station towards the UE based in part on the beam diversity request. In some examples, the beam measurements may include beam characteristic correlation information for the plurality of directional candidate beams. The beam characteristic correlation information for the plurality of directional candidate beams may include one or more of RSRP correlation information, AoA separation information, or spatial correlation information for the plurality of directional candidate beams. It should be appreciated that additional factors that may affect correlation in the UE receiving a beam from the base station may also be considered in beam measurements. Aspects of block 510 described above may be performed by beam diversity selection component 450 described with reference to FIG. 4. Specifically, the beam diversity selection component 450 may include an RSRP-correlation component 455 to measure the RSRP of each received beam over a plurality of time periods in order to identify RSRP correlation between a plurality of beams.

In some examples, performing the beam measurements may include determining whether the one or more candidate beams satisfy the AoA separation threshold. For example, the method may include identifying a first AoA for a first candidate beam from the plurality of directional candidate beams, and identifying a second AoA for a second candidate beam from the plurality of directional candidate beams. The method may further include selecting, at the UE, the first candidate beam and the second candidate beam based on a determination that the first AoA and the second AoA satisfies the AoA separation threshold. In some examples, the AoA separation component 460 may perform the beam measurements associated with AoA separation.

In another example, performing the beam measurements may include determining whether the one or more candidate beams satisfy the RSRP correlation threshold. In such instance, the UE may identify a first RSRP for a first candidate beam from the plurality of directional candidate beams during a first time period, and identify a second RSRP for the first candidate beam during a second time period. The UE may further calculate RSRP correlation between the first RSRP and the second RSRP, and select, at the UE, the first candidate beam based on a determination that the RSRP correlation is less than the RSRP-correlation threshold. In some examples, selecting the first candidate beam may include reporting the beam ID associated with the first candidate beam to the base station such that the base station may configure the TCI states. In some examples, the RSRP correlation component 460 may perform the beam measurements associated with the RSRP correlation for the plurality of candidate beams.

In yet another example, performing the beam measurements may include determining whether the one or more candidate beams satisfy the spatial correlation threshold. In such instance, the method may include determining whether a spatial correlation between a first candidate beam and a second candidate beam from the plurality of directional candidate beams satisfies the spatial-correlation threshold. The method may further include selecting, at the UE, the first candidate beam and the second candidate beam based on a determination that spatial correlation is less than the spatial-correlation threshold.

In some examples, performing the beam measurements may include performing a first beam measurement for one or more uplink beams, performing a second beam measurement for one or more downlink beams, and generating the beam diversity response that reports the first beam measurement for the one or more uplink beams separate from the second beam measurement for the one or more downlink beams. Specifically, in some examples, the UE may report beams for diversity as a separate report for uplink beams and a separate report for downlink beams. For instance, the UE may report {SSB 10, 30} for DL beams, while {SSB 5, SSB 30} for UL beams. Thus, in cases where downlink beam may be considered good (e.g., satisfies channel condition threshold), but the uplink beam derived from downlink may not be good (e.g., due to maximum power emission (MPE), the base station may request the UE to provide reports associated with a set of diverse beams for downlink beams which the base station can use for transmitting PDCCH, and a separate set of UE uplink beams for receiving PUCCH.

In some examples, the spatial correlation component 465 may perform the beam measurements associated with determining whether one or more candidate beams satisfy spatial correlation.

At block 515, the method 500 may optionally include selecting, at the UE, one or more beams from the plurality of directional candidate beams transmitted by the base station that satisfy a beam diversity threshold. For example, in an aspect, aspects of block 515 may also be performed by beam diversity selection component 450 described with reference to FIG. 4.

At block 520, the method 500 may include transmitting a beam diversity response based on the beam measurements. In some examples, the beam diversity response may include beam indices of the one or more beams selected from the plurality of directional candidate beams. In other examples, instead of beam indices, the beam diversity response may include a beam measurement report associated with one or more of the RSRP correlation, AoA separation, or the spatial correlation for the plurality of directional candidate beams. As such, the base station 102 may group one or more beams based on the beam measurement report. Aspects of block 420 may be performed by transceiver 402 in conjunction measurement reporting component 470 with described with reference to FIG. 4.

At block 525, the method 500 may optionally include receiving identification of a plurality of TCI states, wherein the plurality are uncorrelated beams each selected from different groupings of correlated beams based on the beam diversity response. Aspects of block 525 may be performed by transceiver 402 described with reference to FIG. 4.

At block 530, the method may include communicating based on the identified plurality of TCI states. Aspects of block 420 may be performed by transceiver 402 in conjunction measurement reporting component 470 with described with reference to FIG. 4.

Figure 6:
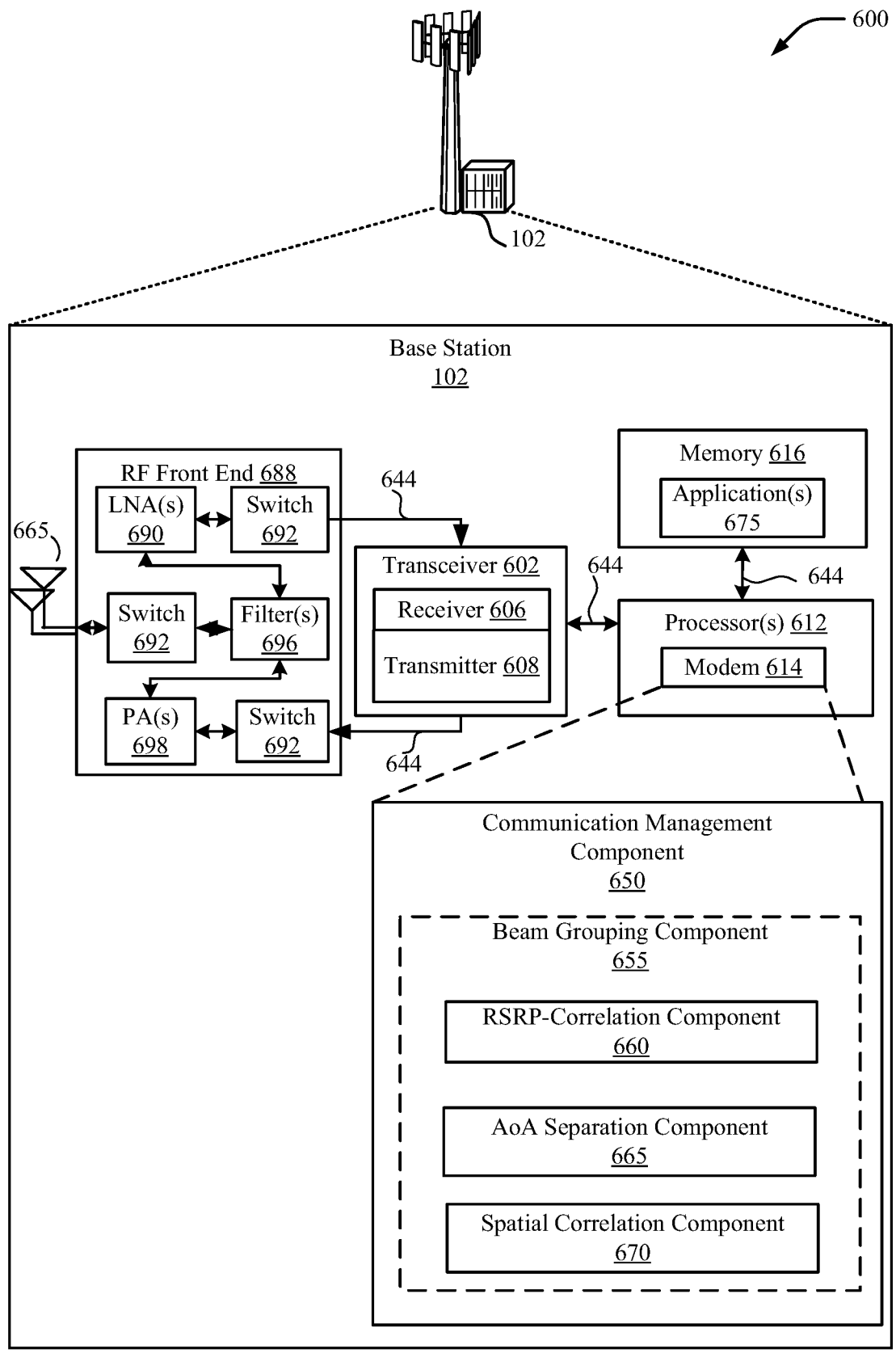
FIG. 6 illustrates an example of a schematic diagram of an aspect of an implementation of various components of a base station in accordance with various aspects of the present disclosure.

FIG. 6 illustrates a hardware components and subcomponents of a device that may be a base station 102 for implementing one or more methods (e.g., method 700) described herein in accordance with various aspects of the present disclosure. For example, one example of an implementation of the base station 102 may include a variety of components, some of which have already been described above, but including components such as one or more processors 612, memory 616 and transceiver 602 in communication via one or more buses 644, which may operate in conjunction with the communication management component 650 to perform functions described herein related to including one or more methods (e.g., 700) of the present disclosure.

In some examples, the communication management component 650 may include a beam grouping component 655 may that may group one or more beams into one or more TCI states based on the beam indices or beam measurement reports received from the UE 104. In the instance where the base station 102 may receive the beam measurement reports in lieu of beam indices selected by the UE 104, the beam grouping component 655 may employ one or more RSRP-correlation component 660, AoA separation component 655, and/or spatial correlation component 670 to group one or more beams based on RSRP correlation measurements, AoA separation measurements, and/or spatial correlation measurements that may be received in the beam measurement reports from the UE 104.

The one or more processors 612, modem 614, memory 616, transceiver 602, RF front end 688 and one or more antennas 665, may be configured to support voice and/or data calls (simultaneously or non-simultaneously) in one or more radio access technologies. In an aspect, the one or more processors 612 can include a modem 614 that uses one or more modem processors. The various functions related to communication management component 650 may be included in modem 614 and/or processors 612 and, in an aspect, can be executed by a single processor, while in other aspects, different ones of the functions may be executed by a combination of two or more different processors. For example, in an aspect, the one or more processors 612 may include any one or any combination of a modem processor, or a baseband processor, or a digital signal processor, or a transmit processor, or a receiver processor, or a transceiver processor associated with transceiver 602. In other aspects, some of the features of the one or more processors 612 and/or modem 614 associated with communication management component 650 may be performed by transceiver 602.

The memory 616 may be configured to store data used herein and/or local versions of application(s) 675 or communication management component 650 and/or one or more of its subcomponents being executed by at least one processor 612. The memory 416 can include any type of computer-readable medium usable by a computer or at least one processor 612, such as random access memory (RAM), read only memory (ROM), tapes, magnetic discs, optical discs, volatile memory, non-volatile memory, and any combination thereof. In an aspect, for example, the memory 616 may be a non-transitory computer-readable storage medium that stores one or more computer-executable codes defining communication management component 650 and/or one or more of its subcomponents, and/or data associated therewith, when the UE 104 is operating at least one processor 612 to execute communication management component 650 and/or one or more of its subcomponents.

The transceiver 602 may include at least one receiver 606 and at least one transmitter 608. The receiver 606 may include hardware, firmware, and/or software code executable by a processor for receiving data, the code comprising instructions and being stored in a memory (e.g., computer-readable medium). The receiver 606 may be, for example, a radio frequency (RF) receiver. In an aspect, the receiver 606 may receive signals transmitted by at least one UE 104. Additionally, receiver 606 may process such received signals, and also may obtain measurements of the signals, such as, but not limited to, Ec/Io, SNR, RSRP, RSSI, etc. The transmitter 608 may include hardware, firmware, and/or software code executable by a processor for transmitting data, the code comprising instructions and being stored in a memory (e.g., computer-readable medium). A suitable example of the transmitter 608 may including, but is not limited to, an RF transmitter.

Moreover, in an aspect, transmitting device may include the RF front end 688, which may operate in communication with one or more antennas 665 and transceiver 602 for receiving and transmitting radio transmissions, for example, wireless communications transmitted by at least one base station 102 or wireless transmissions transmitted by UE 104. The RF front end 688 may be connected to one or more antennas 665 and can include one or more low-noise amplifiers (LNAs) 690, one or more switches 692, one or more power amplifiers (PAs) 698, and one or more filters 696 for transmitting and receiving RF signals.

In an aspect, the LNA 690 can amplify a received signal at a desired output level. In an aspect, each LNA 690 may have a specified minimum and maximum gain values. In an aspect, the RF front end 688 may use one or more switches 692 to select a particular LNA 690 and its specified gain value based on a desired gain value for a particular application.

Further, for example, one or more PA(s) 698 may be used by the RF front end 688 to amplify a signal for an RF output at a desired output power level. In an aspect, each PA 698 may have specified minimum and maximum gain values. In an aspect, the RF front end 688 may use one or more switches 692 to select a particular PA 698 and its specified gain value based on a desired gain value for a particular application.

Also, for example, one or more filters 696 can be used by the RF front end 688 to filter a received signal to obtain an input RF signal. Similarly, in an aspect, for example, a respective filter 696 can be used to filter an output from a respective PA 398 to produce an output signal for transmission. In an aspect, each filter 496 can be connected to a specific LNA 690 and/or PA 698. In an aspect, the RF front end 488 can use one or more switches 692 to select a transmit or receive path using a specified filter 696, LNA 690, and/or PA 698, based on a configuration as specified by the transceiver 602 and/or processor 612.

As such, the transceiver 602 may be configured to transmit and receive wireless signals through one or more antennas 665 via the RF front end 688. In an aspect, the transceiver 602 may be tuned to operate at specified frequencies such that transmitting device can communicate with, for example, one or more UEs 104 or one or more cells associated with one or more base stations 102. In an aspect, for example, the modem 614 can configure the transceiver 602 to operate at a specified frequency and power level based on the configuration of the transmitting device and the communication protocol used by the modem 614.

In an aspect, the modem 614 can be a multiband-multimode modem, which can process digital data and communicate with the transceiver 602 such that the digital data is sent and received using the transceiver 602. In an aspect, the modem 614 can be multiband and be configured to support multiple frequency bands for a specific communications protocol. In an aspect, the modem 614 can be multimode and be configured to support multiple operating networks and communications protocols. In an aspect, the modem 614 can control one or more components of transmitting device (e.g., RF front end 688, transceiver 602) to enable transmission and/or reception of signals from the network based on a specified modem configuration. In an aspect, the modem configuration can be based on the mode of the modem 614 and the frequency band in use. In another aspect, the modem configuration can be based on UE configuration information associated with transmitting device as provided by the network during cell selection and/or cell reselection.

Figure 7:
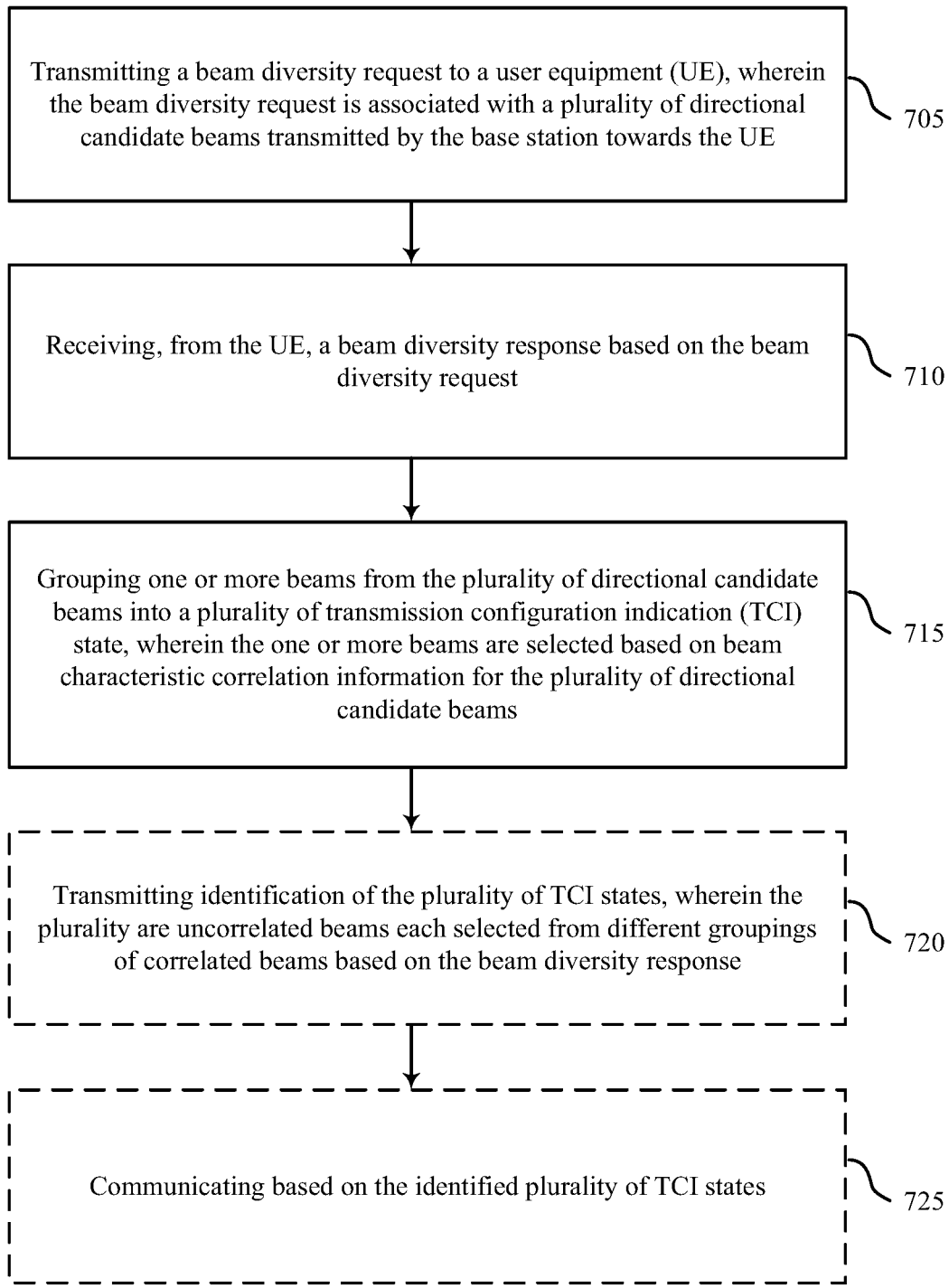
FIG. 7 illustrates an example of a method of wireless communication implemented by the base station in accordance with aspects of the present disclosure.

FIG. 7 is a flowchart of an example method 700 for wireless communications in accordance with aspects of the present disclosure. The method 700 may be performed using the base station 102. Although the method 700 is described below with respect to the elements of the base station 102, other components may be used to implement one or more of the steps described herein.

At block 705, the method 700 may include transmitting a beam diversity request to a UE, wherein the beam diversity request is associated with a plurality of directional candidate beams transmitted by the base station towards the UE. In some examples, the beam diversity request from the base station includes information associated with beam diversity threshold. In some examples, beam diversity threshold may comprise of one or more of RSRP-correlation threshold, AoA separation threshold, or spatial-correlation threshold that the beam measurements must satisfy to be included in the beam diversity response. Aspects of block 705 may be performed by transceiver 602 described with reference to FIG. 6.

At block 710, the method 700 may include receiving, from the UE, a beam diversity response based on the beam diversity request. In some examples, the beam diversity response may include beam indices of the one or more beams selected from the plurality of directional candidate beams. In another example, the beam diversity response includes a beam measurement report associated with one or more of the RSRP correlation, AoA separation, or the spatial correlation for the plurality of directional candidate beams. Aspects of block 710 may also be performed by transceiver 602 described with reference to FIG. 6.

At block 715, the method 700 may include grouping one or more beams from the plurality of directional candidate beams into a plurality of TCI states, wherein the one or more beams are selected based on beam characteristic correlation information for the plurality of directional candidate beams. In some examples, beam characteristic correlation information for the plurality of directional candidate beams may include on one or more of RSRP correlation, AoA separation, or spatial correlation for the plurality of directional candidate beams. Aspects of block 715 may also be performed by beam grouping component 655, and more particularly one or more of RSRP-correlation component 660, AoA separation component 665, and/or spatial correlation component 670 described with reference to FIG. 6.

At block 720, the method 700 may optionally include transmitting identification of a plurality of TCI states, wherein the plurality are uncorrelated beams each selected from different groupings of correlated beams based on the beam diversity response. Aspects of block 705 may be performed by transceiver 602 described with reference to FIG. 6.

At block 725, the method may include communicating based on the identified plurality of TCI states. Aspects of block 725 may be performed by transceiver 702 with described with reference to FIG. 5.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

It should be noted that the techniques described above may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

Some Further Example Embodiments

An example method for wireless communications implemented by a user equipment (UE), comprising: receiving, at the UE, a beam diversity request from a base station; performing beam measurements for a plurality of directional candidate beams transmitted by the base station towards the UE based in part on the beam diversity request, wherein the beam measurements comprise beam characteristic correlation information for the plurality of directional candidate beams; and transmitting a beam diversity response based on the beam measurements.

The above example method, further comprising: receiving identification of a plurality of transmission configuration indication (TCI) states, wherein the plurality are uncorrelated beams each selected from different groupings of correlated beams based on the beam diversity response; and communicating based on the identified plurality of TCI states.

Any of the above example methods, the method may further comprise: selecting, at the UE, one or more beams from the plurality of directional candidate beams transmitted by the base station that satisfy a beam diversity threshold.

Any of the above example methods, wherein the beam diversity response includes beam indices of the one or more beams selected from the plurality of directional candidate beams.

Any of the above example methods, wherein the beam diversity response includes a beam measurement report associated with beam characteristic correlation information for the plurality of directional candidate beams.

Any of the above example methods, wherein the beam diversity request from the base station includes information associated with beam diversity threshold.

Any of the above example methods, wherein the beam diversity threshold includes one or more of RSRP-correlation threshold, AoA separation threshold, or spatial-correlation threshold that the beam measurements must satisfy to be included in the beam diversity response.

Any of the above example methods, wherein performing the beam measurements for the plurality of directional candidate beams transmitted by the base station towards the UE comprises: identifying a first AoA for a first candidate beam from the plurality of directional candidate beams; identifying a second AoA for a second candidate beam from the plurality of directional candidate beams; and selecting, at the UE, the first candidate beam and the second candidate beam based on a determination that the first AoA and the second AoA satisfies a AoA separation threshold.

Any of the above example methods, wherein performing the beam measurements for the plurality of directional candidate beams transmitted by the base station towards the UE comprises: identifying a first RSRP for a first candidate beam from the plurality of directional candidate beams during a first time period; identifying a second RSRP for the first candidate beam during a second time period; calculating RSRP correlation between the first RSRP and the second RSRP; and selecting, at the UE, the first candidate beam based on a determination that the RSRP correlation is less than a RSRP-correlation threshold.

Any of the above example methods, wherein performing the beam measurements for the plurality of directional candidate beams transmitted by the base station towards the UE comprises: determining whether a spatial correlation between a first candidate beam and a second candidate beam from the plurality of directional candidate beams satisfies the spatial-correlation threshold; and selecting, at the UE, the first candidate beam and the second candidate beam based on a determination that spatial correlation is less than a spatial-correlation threshold.

Any of the above example methods, wherein the beam characteristic correlation information for the plurality of directional candidate beams includes one or more of reference signal received power (RSRP) correlation information, angle of arrival (AoA) separation information, or spatial correlation information.

Any of the above example methods, wherein performing the beam measurements for the plurality of directional candidate beams transmitted by the base station towards the UE based in part on the beam diversity request, comprises: performing a first beam measurement for one or more uplink beams; performing a second beam measurement for one or more downlink beams; and generating the beam diversity response that reports the first beam measurement for the one or more uplink beams separate from the second beam measurement for the one or more downlink beams.

An example user equipment (UE) for wireless communications, comprising: a memory configured to store instructions; a processor communicatively coupled with the memory, the processor configured to execute the instructions to: receive, at the UE, a beam diversity request from a base station; perform beam measurements for a plurality of directional candidate beams transmitted by the base station towards the UE based in part on the beam diversity request, wherein the beam measurements comprise beam characteristic correlation information for the plurality of directional candidate beams; and transmit a beam diversity response based on the beam measurements.

In an example UE above, the processor is further configured to execute the instructions to: receive identification of a plurality of transmission configuration indication (TCI) states, wherein the plurality are uncorrelated beams each selected from different groupings of correlated beams based on the beam diversity response; and communicate based on the identified plurality of TCI states.

Any of the above example UE, wherein the processor is further configured to execute the instructions to: select, at the UE, one or more beams from the plurality of directional candidate beams transmitted by the base station that satisfy a beam diversity threshold.

Any of the above example UE, wherein the beam diversity response includes beam indices of the one or more beams selected from the plurality of directional candidate beams.

Any of the above example UE, wherein the beam diversity response includes a beam measurement report associated with beam characteristic correlation information for the plurality of directional candidate beams.

Any of the above example UE, wherein the beam diversity request from the base station includes information associated with beam diversity threshold.

Any of the above example UE, wherein the beam diversity threshold includes one or more of RSRP-correlation threshold, AoA separation threshold, or spatial-correlation threshold that the beam measurements must satisfy to be included in the beam diversity response.

Any of the above example UE, wherein the instructions to perform the beam measurements for the plurality of directional candidate beams transmitted by the base station towards the UE are further executable by the processor to: identify a first AoA for a first candidate beam from the plurality of directional candidate beams; identify a second AoA for a second candidate beam from the plurality of directional candidate beams; and select, at the UE, the first candidate beam and the second candidate beam based on a determination that the first AoA and the second AoA satisfies a AoA separation threshold.

Any of the above example UE, wherein performing the beam measurements for the plurality of directional candidate beams transmitted by the base station towards the UE comprises: identifying a first RSRP for a first candidate beam from the plurality of directional candidate beams during a first time period; identifying a second RSRP for the first candidate beam during a second time period; calculating RSRP correlation between the first RSRP and the second RSRP; and selecting, at the UE, the first candidate beam based on a determination that the RSRP correlation is less than a RSRP-correlation threshold.

Any of the above example UE, wherein performing the beam measurements for the plurality of directional candidate beams transmitted by the base station towards the UE comprises: determining whether a spatial correlation between a first candidate beam and a second candidate beam from the plurality of directional candidate beams satisfies the spatial-correlation threshold; and selecting, at the UE, the first candidate beam and the second candidate beam based on a determination that spatial correlation is less than a spatial-correlation threshold.

Any of the above example UE, wherein the beam characteristic correlation information for the plurality of directional candidate beams includes one or more of reference signal received power (RSRP) correlation information, angle of arrival (AoA) separation information, or spatial correlation information.

Any of the above example UE, wherein the instructions to perform the beam measurements for the plurality of directional candidate beams transmitted by the base station towards the UE based in part on the beam diversity request are further executable by the processor to: perform a first beam measurement for one or more uplink beams; perform a second beam measurement for one or more downlink beams; and generate the beam diversity response that reports the first beam measurement for the one or more uplink beams separate from the second beam measurement for the one or more downlink beams.

An example method for wireless communications implemented by a base station, comprising: transmitting a beam diversity request to a user equipment (UE), wherein the beam diversity request is associated with a plurality of directional candidate beams transmitted by the base station towards the UE; receiving, from the UE, a beam diversity response based on the beam diversity request; and grouping one or more beams from the plurality of directional candidate beams into a plurality of transmission configuration indication (TCI) states, wherein the one or more beams are selected based on beam characteristic correlation information for the plurality of directional candidate beams.

The above example method, further comprising: transmitting identification of a plurality of transmission configuration indication (TCI) states, wherein the plurality are uncorrelated beams each selected from different groupings of correlated beams based on the beam diversity response; and communicating based on the identified plurality of TCI states.

Any of the above example methods, wherein the beam diversity response includes beam indices of the one or more beams selected from the plurality of directional candidate beams.

Any of the above example methods, wherein the beam diversity response includes a beam measurement report associated with one or more of the RSRP correlation, AoA separation, or the spatial correlation for the plurality of directional candidate beams.

Any of the above example methods, wherein the beam diversity request from the base station includes information associated with beam diversity threshold.

Any of the above example methods, wherein the beam diversity threshold includes one or more of RSRP-correlation threshold, AoA separation threshold, or spatial-correlation threshold that the beam measurements must satisfy to be included in the beam diversity response.

Any of the above example methods, wherein the beam characteristic correlation information for the plurality of directional candidate beams includes one or more of reference signal received power (RSRP) correlation, angle of arrival (AoA) separation, or spatial correlation for the plurality of directional candidate beams.

An example apparatus for wireless communications, comprising: a memory configured to store instructions; a processor communicatively coupled with the memory, the processor configured to execute the instructions to: transmit a beam diversity request to a user equipment (UE), wherein the beam diversity request is associated with a plurality of directional candidate beams transmitted by a base station towards the UE; receiving, from the UE, a beam diversity response based on the beam diversity request; and grouping one or more beams from the plurality of directional candidate beams into a transmission configuration indication (TCI) state, wherein the one or more beams are selected based on beam characteristic correlation information for the plurality of directional candidate beams.

The above example apparatus, wherein the processor is further configured to execute the instructions to: transmit identification of a plurality of transmission configuration indication (TCI) states, wherein the plurality are uncorrelated beams each selected from different groupings of correlated beams based on the beam diversity response; and communicating based on the identified plurality of TCI states.

Any of the above example apparatus, wherein the beam diversity response includes beam indices of the one or more beams selected from the plurality of directional candidate beams.

Any of the above example apparatus, wherein the beam diversity response includes a beam measurement report associated with one or more of the RSRP correlation, AoA separation, or the spatial correlation for the plurality of directional candidate beams.

Any of the above example apparatus, wherein the beam diversity request from the base station includes information associated with beam diversity threshold.

Any of the above example apparatus, wherein the beam diversity threshold includes one or more of RSRP-correlation threshold, AoA separation threshold, or spatial-correlation threshold that the beam measurements must satisfy to be included in the beam diversity response.

Any of the above example apparatus, wherein the beam characteristic correlation information for the plurality of directional candidate beams includes one or more of reference signal received power (RSRP) correlation, angle of arrival (AoA) separation, or spatial correlation for the plurality of directional candidate beams.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communications implemented by a user equipment (UE), comprising:
receiving, at the UE, a beam diversity request from a base station;
performing beam measurements for a plurality of directional candidate beams transmitted by the base station towards the UE based in part on the beam diversity request, wherein the beam measurements comprise beam characteristic correlation information for the plurality of directional candidate beams, and performing the beam measurements includes:
  identifying a first reference signal received power (RSRP) for a first candidate beam from the plurality of directional candidate beams during a first time period;
  identifying a second RSRP for the first candidate beam during a second time period; and
  calculating a RSRP correlation between the first RSRP for the first candidate beam and the second RSRP for the first candidate beam;
selecting, at the UE, one or more beams from the plurality of directional candidate beams transmitted by the base station that satisfy a beam diversity threshold, wherein selecting the one or more beams includes selecting the first candidate beam based on a determination that the RSRP correlation is less than a RSRP-correlation threshold; and
transmitting a beam diversity response based on the beam measurements.

2. The method of claim 1, further comprising:
receiving identification of a plurality of transmission configuration indication (TCI) states, wherein the plurality of TCI states are uncorrelated beams each selected from different groupings of correlated beams based on the beam diversity response; and
communicating based on the plurality of TCI states.

3. The method of claim 1, wherein the beam diversity response includes beam indices of the one or more beams selected from the plurality of directional candidate beams.

4. The method of claim 1, wherein the beam diversity response includes a beam measurement report associated with beam characteristic correlation information for the plurality of directional candidate beams.

5. The method of claim 1, wherein the beam diversity threshold further includes one or more of an angle-of-arrival (AoA) separation threshold, or spatial-correlation threshold that the beam measurements must satisfy to be included in the beam diversity response.

6. The method of claim 1, wherein performing the beam measurements for the plurality of directional candidate beams transmitted by the base station towards the UE comprises:
determining whether a spatial correlation between the first candidate beam and a second candidate beam from the plurality of directional candidate beams satisfies a spatial-correlation threshold; and
selecting, at the UE, the first candidate beam and the second candidate beam based on a determination that the spatial correlation is less than the spatial-correlation threshold.

7. The method of claim 1, wherein the beam characteristic correlation information for the plurality of directional candidate beams includes one or more of reference signal received power (RSRP) correlation information, angle of arrival (AoA) separation information, or spatial correlation information.

8. The method of claim 1, wherein performing the beam measurements for the plurality of directional candidate beams transmitted by the base station towards the UE based in part on the beam diversity request, comprises:
performing a first beam measurement for one or more uplink beams;
performing a second beam measurement for one or more downlink beams; and
generating the beam diversity response that reports the first beam measurement for the one or more uplink beams separate from the second beam measurement for the one or more downlink beams.

9. The method of claim 1, wherein selecting the one or more beams further includes:
identifying a first angle-of-arrival (AoA) for the first candidate beam from the plurality of directional candidate beams;
identifying a second AoA for a second candidate beam from the plurality of directional candidate beams; and
selecting, at the UE, the first candidate beam and the second candidate beam based on a determination that the first AoA and the second AoA satisfies a AoA separation threshold,
wherein the beam diversity threshold that includes at least the AoA separation threshold is received from the base station in the beam diversity request.

10. The method of claim 1, wherein the RSRP is a first RSRP correlation, and selecting the one or more beams further includes:
rejecting a second candidate beam based on a determination that a second RSRP correlation is greater than the RSRP-correlation threshold, the second RSRP correlation being a difference between a first RSRP for the second candidate beam during the first time period and a second RSRP for the second candidate beam during the second time period.

11. A user equipment (UE) for wireless communications, comprising:
a memory configured to store instructions;
a processor communicatively coupled with the memory, the processor configured to execute the instructions to:
receive, at the UE, a beam diversity request from a base station;
perform beam measurements for a plurality of directional candidate beams transmitted by the base station towards the UE based in part on the beam diversity request, wherein the beam measurements comprise beam characteristic correlation information for the plurality of directional candidate beams, and the processor configured to perform the beam measurements is further configured to execute the instructions:
identify a first reference signal received power (RSRP) for a first candidate beam from the plurality of directional candidate beams during a first time period;
identify a second RSRP for the first candidate beam during a second time period; and
calculate a RSRP correlation between the first RSRP and the second RSRP;
select, at the UE, one or more beams from the plurality of directional candidate beams transmitted by the base station that satisfy a beam diversity threshold, wherein the processor configured to select the one or more beams is further configured to execute the instructions to select the first candidate beam based on a determination that the RSRP correlation is less than a RSRP-correlation threshold; and
transmit a beam diversity response based on the beam measurements.

12. The UE of claim 11, wherein the processor is further configured to execute the instructions to:
receive identification of a plurality of transmission configuration indication (TCI) states, wherein the plurality of TCI states are uncorrelated beams each selected from different groupings of correlated beams based on the beam diversity response; and
communicate based on the plurality of TCI states.

13. The UE of claim 11, wherein the beam diversity response includes beam indices of the one or more beams selected from the plurality of directional candidate beams.

14. The UE of claim 11, wherein the beam diversity response includes a beam measurement report associated with beam characteristic correlation information for the plurality of directional candidate beams.

15. The UE of claim 11, wherein the beam diversity threshold further includes one or more of an angle-of-arrival (AoA) separation threshold, or spatial-correlation threshold that the beam measurements must satisfy to be included in the beam diversity response.

16. The UE of claim 11, wherein performing the beam measurements for the plurality of directional candidate beams transmitted by the base station towards the UE comprises:
determining whether a spatial correlation between the first candidate beam and a second candidate beam from the plurality of directional candidate beams satisfies a spatial-correlation threshold; and
selecting, at the UE, the first candidate beam and the second candidate beam based on a determination that the spatial correlation is less than the spatial-correlation threshold.

17. The UE of claim 11, wherein the beam characteristic correlation information for the plurality of directional candidate beams includes one or more of reference signal received power (RSRP) correlation information, angle of arrival (AoA) separation information, or spatial correlation information.

18. The UE of claim 11, wherein the instructions to perform the beam measurements for the plurality of directional candidate beams transmitted by the base station towards the UE based in part on the beam diversity request are further executable by the processor to:
perform a first beam measurement for one or more uplink beams;
perform a second beam measurement for one or more downlink beams; and
generate the beam diversity response that reports the first beam measurement for the one or more uplink beams separate from the second beam measurement for the one or more downlink beams.

19. The UE of claim 11, wherein the instructions to select the one or more beams are further executable by the processor to:
identify a first angle-of-arrival (AoA) for the first candidate beam from the plurality of directional candidate beams;
identify a second AoA for a second candidate beam from the plurality of directional candidate beams; and
select, at the UE, the first candidate beam and the second candidate beam based on a determination that the first AoA and the second AoA satisfies a AoA separation threshold, wherein the beam diversity threshold includes at least the AoA separation threshold is received from the base station in the beam diversity request.

20. A method for wireless communications implemented by a base station, comprising:
transmitting a beam diversity request to a user equipment (UE), wherein the beam diversity request is associated with a plurality of directional candidate beams transmitted by the base station towards the UE and includes information associated with a reference signal received Dower-correlation (RSRP-correlation) threshold that must be satisfied between a first RSRP for a first candidate beam from the plurality of directional candidate beams during a first time period and a second RSRP for the first candidate beam during a second time period;
receiving, from the UE, a beam diversity response based on the beam diversity request; and
grouping one or more beams from the plurality of directional candidate beams into a plurality of transmission configuration indication (TCI) states, wherein the one or more beams are selected based on beam characteristic correlation information for the plurality of directional candidate beams.

21. The method of claim 20, further comprising:
transmitting identification of the plurality of transmission configuration indication (TCI) states, wherein the plurality of TCI states are uncorrelated beams each selected from different groupings of correlated beams based on the beam diversity response; and
communicating based on the plurality of TCI states.

22. The method of claim 20, wherein the beam diversity response includes beam indices of the one or more beams selected from the plurality of directional candidate beams.

23. The method of claim 20, wherein the beam diversity response includes a beam measurement report associated with one or more of the RSRP-correlation, an angle-of-arrival (AoA) separation, or a spatial correlation for the plurality of directional candidate beams.

24. The method of claim 20, wherein the beam diversity request includes information associated with an angle-of-arrival (AoA) separation threshold that must be satisfied between a first AoA for the first candidate beam from the plurality of directional candidate beams and a second AoA for a second candidate beam from the plurality of directional candidate beams.

25. An apparatus for wireless communications, comprising:
a memory configured to store instructions;
a processor communicatively coupled with the memory, the processor configured to execute the instructions to:
transmit a beam diversity request to a user equipment (UE), wherein the beam diversity request is associated with a plurality of directional candidate beams transmitted by a base station towards the UE and includes information associated with a reference signal received power-correlation (RSRP-correlation) threshold that must be satisfied between a first RSRP for a first candidate beam from the plurality of directional candidate beams during a first time period and a second RSRP for the first candidate beam during a second time period;
receiving, from the UE, a beam diversity response based on the beam diversity request; and
grouping one or more beams from the plurality of directional candidate beams into a transmission configuration indication (TCI) state, wherein the one or more beams are selected based on beam characteristic correlation information for the plurality of directional candidate beams.

26. The apparatus of claim 25, wherein the processor is further configured to execute the instructions to:
transmit identification of a plurality of transmission configuration indication (TCI) states, wherein the plurality of TCI states are uncorrelated beams each selected from different groupings of correlated beams based on the beam diversity response; and
communicate based on the plurality of TCI states.

27. The apparatus of claim 25, wherein the beam diversity response includes beam indices of the one or more beams selected from the plurality of directional candidate beams.

28. The apparatus of claim 25, wherein the beam diversity response includes a beam measurement report associated with one or more of the RSRP-correlation, AoA separation, or a spatial correlation for the plurality of directional candidate beams.

29. The apparatus of claim 25, wherein the beam diversity request includes information associated with an angle-of-arrival (AoA) separation threshold that must be satisfied between a first AoA for the first candidate beam from the plurality of directional candidate beams and a second AoA for a second candidate beam from the plurality of directional candidate beams.

* * * * *